(12) United States Patent
Helbing

(10) Patent No.: US 7,842,382 B2
(45) Date of Patent: Nov. 30, 2010

(54) BINDER COMPOSITIONS AND ASSOCIATED METHODS

(75) Inventor: Clarence H. Helbing, Shelbyville, IN (US)

(73) Assignee: Knauf Insulation GmbH, Shelbyville, IN (US)

( * ) Notice: Subject to any disclaimer, the term of this patent is extended or adjusted under 35 U.S.C. 154(b) by 620 days.

(21) Appl. No.: 10/965,359

(22) Filed: Oct. 13, 2004

(65) Prior Publication Data

US 2005/0202224 A1 Sep. 15, 2005

Related U.S. Application Data

(60) Provisional application No. 60/552,361, filed on Mar. 11, 2004.

(51) Int. Cl.
D02G 3/00 (2006.01)
C08F 8/32 (2006.01)
(52) U.S. Cl. .................. 428/375; 428/297.4; 428/299.4; 428/298.7; 428/300.1; 428/392; 525/327.6; 525/327.4; 524/556; 427/384; 427/385.5; 427/389.7; 427/389.9
(58) Field of Classification Search ........................ None
See application file for complete search history.

(56) References Cited

U.S. PATENT DOCUMENTS

| | | |
|---|---|---|
| 1,801,052 A | 4/1931 | Meigs |
| 1,801,053 A | 4/1931 | Meigs |
| 1,886,353 A | 11/1932 | Novotny et al. |
| 2,392,105 A | 1/1946 | Sussman |
| 3,232,821 A | 2/1966 | Moore et al. |
| 3,802,897 A | 4/1974 | Voigt et al. |
| 3,809,664 A | 5/1974 | Fanta et al. |
| 3,826,767 A | 7/1974 | Hoover et al. |
| 3,856,606 A | 12/1974 | Fan et al. |
| 3,911,048 A | 10/1975 | Vargiu et al. |
| 4,028,290 A | 6/1977 | Reid |
| 4,048,127 A | 9/1977 | Gibbons et al. |
| 4,054,713 A | 10/1977 | Sakaguchi et al. |
| 4,097,427 A | 6/1978 | Aitken et al. |
| 4,107,379 A | 8/1978 | Stofko |
| 4,148,765 A | 4/1979 | Nelson |
| 4,183,997 A | 1/1980 | Stofko |
| 4,233,432 A | 11/1980 | Curtis, Jr. |
| 4,246,367 A | 1/1981 | Curtis, Jr. |
| 4,278,573 A | 7/1981 | Tessler |
| 4,296,173 A | 10/1981 | Fahey |
| 4,301,310 A | 11/1981 | Wagner |
| 4,330,443 A | 5/1982 | Rankin |
| 4,357,194 A | 11/1982 | Stofko |
| 4,400,496 A | 8/1983 | Butler et al. |
| 4,464,523 A | 8/1984 | Neigel et al. |
| 4,524,164 A | 6/1985 | Viswanathan et al. |
| 4,668,716 A | 5/1987 | Pepe et al. |
| 4,692,478 A | 9/1987 | Viswanathan et al. |
| 4,754,056 A | 6/1988 | Ansel et al. |
| 4,845,162 A | 7/1989 | Schmitt et al. |
| 4,906,237 A | 3/1990 | Johansson et al. |
| 4,912,147 A | 3/1990 | Pfoehler et al. |
| 4,923,980 A | 5/1990 | Blomberg |
| 5,037,930 A | 8/1991 | Shih |
| 5,041,595 A | 8/1991 | Yang et al. |
| 5,095,054 A | 3/1992 | Lay et al. |
| 5,106,615 A | 4/1992 | Dikstein |
| 5,114,004 A | 5/1992 | Isono et al. |
| 5,124,369 A | 6/1992 | Vandichel et al. |
| 5,151,465 A | 9/1992 | Le-Khac |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,340,868 A | 8/1994 | Strauss et al. |
| 5,371,194 A | 12/1994 | Ferretti |
| 5,387,665 A | 2/1995 | Misawa et al. |
| 5,393,849 A | 2/1995 | Srinivasan et al. |
| 5,434,233 A | 7/1995 | Kiely et al. |
| 5,480,973 A | 1/1996 | Goodlad et al. |
| 5,498,662 A | 3/1996 | Tanaka et al. |
| 5,536,766 A | 7/1996 | Seyffer et al. |
| 5,547,541 A | 8/1996 | Hansen et al. |
| 5,571,618 A | 11/1996 | Hansen et al. |
| 5,578,678 A | 11/1996 | Hartmann et al. |
| 5,582,682 A | 12/1996 | Ferretti |
| 5,583,193 A | 12/1996 | Aravindakshan et al. |

(Continued)

FOREIGN PATENT DOCUMENTS

EP 0 524 518 7/1992

(Continued)

OTHER PUBLICATIONS

Ames, J. M., "The Maillard Browning Reaction—an Update", Chemistry & Industry, No. 17, 1988, 4 pages.

(Continued)

*Primary Examiner*—Jill Gray
(74) *Attorney, Agent, or Firm*—Barnes & Thornburg LLP

(57) ABSTRACT

Disclosed are formaldehyde-free, thermally-curable, alkaline, aqueous binder compositions, curable to formaldehyde-free, water-insoluble thermoset polyester resins, and uses thereof as binders for non-woven fibers and fiber materials.

15 Claims, No Drawings

U.S. PATENT DOCUMENTS

| | | | |
|---|---|---|---|
| 5,609,727 A | 3/1997 | Hansen et al. | |
| 5,614,570 A | 3/1997 | Hansen et al. | |
| 5,620,940 A | 4/1997 | Birbara et al. | |
| 5,621,026 A | 4/1997 | Tanaka et al. | |
| 5,633,298 A | 5/1997 | Arfaei et al. | |
| 5,643,978 A | 7/1997 | Darwin et al. | |
| 5,645,756 A | 7/1997 | Dubin et al. | |
| 5,661,213 A | 8/1997 | Arkens et al. | |
| 5,691,060 A | 11/1997 | Levy | |
| 5,693,411 A | 12/1997 | Hansen et al. | |
| 5,756,580 A | 5/1998 | Natori et al. | |
| 5,855,987 A | 1/1999 | Margel et al. | |
| 5,885,337 A | 3/1999 | Nohr et al. | |
| 5,895,804 A | 4/1999 | Lee et al. | |
| 5,919,831 A | 7/1999 | Philipp | |
| 5,925,722 A | 7/1999 | Exner et al. | |
| 5,929,184 A | 7/1999 | Holmes-Farley et al. | |
| 5,932,344 A | 8/1999 | Ikemoto et al. | |
| 5,932,665 A | 8/1999 | DePorter et al. | |
| 5,932,689 A | 8/1999 | Arkens et al. | |
| 5,942,123 A | 8/1999 | McArdle | |
| 5,977,224 A | 11/1999 | Cheung et al. | |
| 5,977,232 A | 11/1999 | Arkens et al. | |
| 5,981,719 A | 11/1999 | Woiszwillo et al. | |
| 5,983,586 A | 11/1999 | Berdan, II et al. | |
| 5,990,216 A | 11/1999 | Cai et al. | |
| 6,072,086 A | 6/2000 | James et al. | |
| 6,077,883 A | 6/2000 | Taylor et al. | |
| 6,090,925 A | 7/2000 | Woiszwillo et al. | |
| 6,114,033 A | 9/2000 | Ikemoto et al. | |
| 6,114,464 A | 9/2000 | Reck et al. | |
| 6,136,916 A | 10/2000 | Arkens et al. | |
| 6,171,654 B1 * | 1/2001 | Salsman et al. | 427/389.8 |
| 6,210,472 B1 | 4/2001 | Kwan et al. | |
| 6,221,973 B1 | 4/2001 | Arkens et al. | |
| 6,310,227 B1 | 10/2001 | Sarama et al. | |
| 6,313,102 B1 | 11/2001 | Colaco et al. | |
| 6,319,683 B1 | 11/2001 | James et al. | |
| 6,331,350 B1 | 12/2001 | Taylor et al. | |
| 6,379,739 B1 | 4/2002 | Formanek et al. | |
| 6,395,856 B1 | 5/2002 | Petty et al. | |
| 6,440,204 B1 | 8/2002 | Rogols et al. | |
| 6,468,442 B2 | 10/2002 | Bytnar | |
| 6,468,730 B2 | 10/2002 | Fujiwara et al. | |
| 6,482,875 B2 | 11/2002 | Lorenz et al. | |
| 6,495,656 B1 | 12/2002 | Haile et al. | |
| 6,525,009 B2 | 2/2003 | Sachdev et al. | |
| 6,613,378 B1 | 9/2003 | Erhan et al. | |
| 6,638,884 B2 | 10/2003 | Quick et al. | |
| 6,753,361 B2 | 6/2004 | Kroner et al. | |
| 6,852,247 B2 | 2/2005 | Bytnar | |
| 6,858,074 B2 | 2/2005 | Anderson et al. | |
| 6,861,495 B2 | 3/2005 | Barsotti et al. | |
| 6,864,044 B2 | 3/2005 | Ishikawa et al. | |
| 6,955,844 B2 | 10/2005 | Tagge et al. | |
| 7,029,717 B1 | 4/2006 | Ojima et al. | |
| 7,067,579 B2 | 6/2006 | Taylor et al. | |
| 7,090,745 B2 | 8/2006 | Beckman et al. | |
| 7,141,626 B2 | 11/2006 | Rodrigues et al. | |
| 7,195,792 B2 | 3/2007 | Boston et al. | |
| 7,201,778 B2 | 4/2007 | Smith et al. | |
| 2002/0032253 A1 | 3/2002 | Lorenz et al. | |
| 2002/0091185 A1 * | 7/2002 | Taylor et al. | 524/249 |
| 2002/0161108 A1 | 10/2002 | Schultz et al. | |
| 2003/0005857 A1 | 1/2003 | Minami et al. | |
| 2004/0019168 A1 | 1/2004 | Soerens et al. | |
| 2004/0033747 A1 * | 2/2004 | Miller et al. | 442/180 |
| 2004/0038017 A1 * | 2/2004 | Tutin et al. | 428/297.4 |
| 2004/0077055 A1 | 4/2004 | Fosdick et al. | |
| 2004/0122166 A1 | 6/2004 | O'Brien-Bernini et al. | |
| 2004/0152824 A1 * | 8/2004 | Dobrowolski | 524/494 |
| 2004/0249066 A1 | 12/2004 | Heinzman et al. | |
| 2004/0254285 A1 | 12/2004 | Rodrigues et al. | |
| 2005/0059770 A1 * | 3/2005 | Srinivasan et al. | 524/494 |
| 2005/0171085 A1 | 8/2005 | Pinto et al. | |
| 2005/0196421 A1 | 9/2005 | Hunter et al. | |
| 2005/0215153 A1 | 9/2005 | Cossement et al. | |
| 2005/0275133 A1 | 12/2005 | Cabell et al. | |
| 2006/0099870 A1 | 5/2006 | Garcia et al. | |
| 2006/0135433 A1 | 6/2006 | Murray et al. | |
| 2006/0252855 A1 | 11/2006 | Pisanova et al. | |
| 2007/0006390 A1 | 1/2007 | Clamen et al. | |
| 2007/0009582 A1 | 1/2007 | Madsen et al. | |

FOREIGN PATENT DOCUMENTS

| | | |
|---|---|---|
| EP | 0 547 819 | 12/1992 |
| EP | 0 583 086 | 2/1994 |
| EP | 0 672 720 A1 | 3/1995 |
| EP | 0 714 754 | 6/1996 |
| EP | 0 826 710 A2 | 3/1998 |
| EP | 0 873 976 A1 | 10/1998 |
| EP | 0 882 756 | 12/1998 |
| EP | 0 911 361 | 4/1999 |
| EP | 0 990 729 A1 | 4/2000 |
| EP | 1 038 433 | 9/2000 |
| EP | 1 193 288 | 9/2001 |
| EP | 1 225 193 A2 | 7/2002 |
| EP | 1 486 547 | 6/2004 |
| FR | 2 614 388 | 10/1988 |
| GB | 2 078 805 | 1/1982 |
| JP | 58011193 | 1/1983 |
| JP | 03173680 | 7/1991 |
| JP | 07034023 | 3/1995 |
| JP | 2004-60058 | 2/2004 |
| SU | 374400 | 3/1973 |
| WO | 99/47765 | 9/1999 |
| WO | 03/071879 | 9/2003 |
| WO | WO 2004/076734 | 9/2004 |
| WO | 2006/044302 | 4/2006 |

OTHER PUBLICATIONS

"Gamma-aminopropyltrimethoxysilane", Hawley's Condensed Chemical Dictionary, 14$^{th}$ Edition, John Wiley & Sons, Inc., 2002, 1 page.

* cited by examiner

US 7,842,382 B2

BINDER COMPOSITIONS AND ASSOCIATED METHODS

CROSS REFERENCE TO RELATED APPLICATION

This application claims the benefit under 35 U.S.C. §119(e) of U.S. Provisional Patent Application No. 60/552,361, filed Mar. 11, 2004, the disclosure of which is incorporated herein by reference in its entirety.

TECHNICAL FIELD

The present disclosure pertains to binder compositions for non-woven fibers. In particular, the present disclosure pertains to thermally-curable, polyester binders for non-woven fibers.

BACKGROUND

Fiberglass insulation products generally include matted glass fibers that are held together by a cured thermoset polymeric resole resin. During production of such products, streams of molten glass are drawn into fibers of varying lengths and then blown into a forming chamber where they are deposited with little organization, or in varying patterns, as a mat onto a traveling conveyor. The fibers, while in transit in the forming chamber and while still hot from the drawing operation, are sprayed with an aqueous resin binder solution. The residual heat from the glass fibers and the flow of air through the fibrous mat during the forming operation will generally evaporate most of the water from the resin binder, thereby leaving the remaining components of the binder on the fibers as a viscous or semi-viscous high-solids liquid, thereby forming a "wet blanket." The coated fibrous mat or wet blanket, which is formed in a compressed state due to the high-velocity flow of air through the mat in the forming chamber, is then transferred out of the forming chamber to a transfer zone where the mat vertically expands due to the resiliency of the glass fibers. This vertical expansion can be important in the manufacture process of commercially acceptable fiberglass thermal or acoustical insulation products. Subsequently, the coated mat is transferred to a curing oven where heated air is blown through the mat to cure the binder and rigidly attach the glass fibers together.

Phenol-formaldehyde (PF) resins, as well as phenol-formaldehyde resins extended with urea (PFU resins), are used in conventional processes, and have been relied on heavily over the past several years to prepare binders for fiberglass insulation products. Though these resins are inexpensive and provide the cured fiberglass insulation product with the desired physical properties, they may often have high free formaldehyde content, and a distinctive or unpleasant odor limiting their use in certain applications. Further, during the manufacture of fiberglass insulation, the potential for formaldehyde emissions and worker exposure is present. Therefore, manufacturing facilities using PF and PFU resins as the main binder component for insulation products are often required to install expensive abatement equipment in order to minimize the possible exposure of workers to formaldehyde emissions and to meet certain Maximum Achieveable Control Technology (MACT) requirement standards. Options for formaldehyde-free products or processes include i) adding a formaldehyde scavenger to the binder to reduce or remove free formaldehyde and thereby limit its subsequent emission and/or odor; ii) allowing the resin reaction to proceed for longer periods of time to reduce the free formaldehyde present in the resin product; or iii) utilizing formaldehyde-free resin formulations.

However, the use of scavengers may lead to precipitation, resulting from the scavenger itself and/or the adduct between the scavenger and any residual formaldehyde being insoluble, thereby necessitating additional and often expensive filtration steps. Further, allowing the resin reaction to proceed for an extended period of time sufficient to afford target formaldehyde levels results in a resin product having a concomitantly higher molecular weight. Such higher molecular weight resins may lack the desirable properties for some applications, as many tend to be sticky, causing the binder and the binder-coated fiberglass product to adhere to production equipment. Furthermore, higher molecular weight PF resins tend to have a higher "tetradimer" content. Tetradimer is a highly crystalline PF dimer present in phenolic resins produced under base-catalyzed conditions, which often precipitates readily. Precipitation is even more likely when free formaldehyde in the resin is scavenged. Tetradimer precipitation can result in plugged spray nozzles, and in precipitate formation in resin binder storage tanks and in the resin itself, necessitating removal.

Accordingly, as an alternative to PF and PFU resins, formaldehyde-free resin formulations have received increased attention for use as binders in making fiberglass insulation and other products. Suitable binder formulations advantageously have physical properties (e.g., viscosity, dilutability, and adhesiveness) and other characteristics similar to conventional PF and PFU resins, and can be made at low cost. Formulations that have a similar cure time and cure temperature profile, while yielding a cured fiberglass insulation product with equivalent physical properties, may allow the use of existing production equipment.

SUMMARY OF THE INVENTION

Aqueous binder compositions are described. In one aspect, the aqueous binder composition is formaldehyde-free. In another aspect, the aqueous binder composition is thermally-curable. In another aspect, the aqueous binder composition has an alkaline pH. In one illustrative embodiment, the aqueous binder composition cures to a formaldehyde-free, water-insoluble thermoset polyester resin. An aqueous binder composition for use in manufacturing fiber products, including non-woven fiber products such as fiber products composed of fiberglass and/or other fibers, including heat-resistant fibers and the like, is also described. The aqueous binder compositions and associated methods for using the binder compositions may include one or more of the features or combinations of features described herein.

In one illustrative embodiment, the aqueous binder composition includes a polyacid component having acid groups, or anhydride or salt derivatives thereof, and a polyhydroxy component having hydroxyl groups, where the pH of the binder composition is greater than about 7, and is illustratively in the range from about 7 to about 10. In another illustrative embodiment, the composition includes a polyacid component and a polyhydroxy component where the ratio of the number of molar equivalents of acid groups, or anhydride or salt derivatives thereof, present on the polyacid component to the number of molar equivalents of hydroxyl groups present on the polyhydroxy component is in the range from about 0.6:1 to about 1.2:1. In another illustrative embodiment, the composition includes a polyacid component that is a dicarboxylic acid, including, but not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. In another illustrative embodiment, the composition includes a polyacid component that is a tricarboxylic acid, including, but not limited to, unsaturated aliphatic tricarboxylic acids, saturated aliphatic tricarboxylic acids, aromatic tricarboxylic acids, unsaturated cyclic tricarboxylic acids, saturated cyclic tricarboxylic acids, hydroxy-substituted derivatives thereof, and the like. In another illustrative embodiment, the composition includes a polyacid component that is a tetracarboxylic, pentacarboxylic, and like polycarboxylic acids, and salts and anhydride derivatives thereof, and combinations thereof. It is appreciated that any of these polyacids may be optionally substituted, such as with hydroxy, halo, alkyl, alkoxy, and the like. In one illustrative aspect, the composition is an alkaline composition, where the polyacid component is neutralized by the addition of a base or where certain salts of the polyacid component are used. In another illustrative embodiment, the composition includes a polyacid component, such as succinic acid, citric acid, or fumaric acid and the like that has been neutralized by the addition of a base, or is a salt. In another illustrative embodiment, the polyacid component is maleic acid neutralized with, for example, aqueous ammonia. In another illustrative embodiment, the polyacid component is the ammonium salt of maleate. In another illustrative embodiment, the polyhydroxy component is a partially hydrolyzed polyvinyl acetate, such as, for example, an ELVANOL (available from DuPont), or a polyvinyl alcohol. In another illustrative embodiment, the composition further includes a catalyst, such as an acid or an acid/salt, including inorganic and organic acids, and salts thereof. Illustrative organic acids include sulfonic acids and salts thereof, such as para-toluene sulfonic acid, ammonium para-toluene sulfonate, ammonium naphthalene disulfonate, and the like. It is appreciated that such catalysts may be capable of increasing the rate of ester formation during curing of the binder compositions described herein. In another illustrative embodiment, the composition further includes a silicon-containing compound, such as silylethers and alkylsilyl ethers. In one aspect, the silicon-containing compound is an amino-substituted silicon-containing compound, including, but not limited to, gamma-aminopropyltriethoxysilane. It is appreciated that the silicon-containing compound may serve as a coupling agent during curing of the binder compositions described herein.

In another illustrative embodiment, a method for treating fibers, including non-woven fibers, is described. In an illustrative aspect, the method includes contacting fibers with a thermally-curable, aqueous binder composition including a polyacid component and a polyhydroxy component, as described herein, wherein the pH of the binder composition is greater than 7, or, illustratively, is in the range from about 7 to about 10, and heating the thermally-curable, aqueous binder composition at an elevated temperature that is sufficient to cure the binder composition to form a polyester. In one aspect, the polyester is substantially water-insoluble. In another aspect, the polyester is a thermoset.

In another illustrative embodiment, a glass fiber product is described. The glass fiber product includes a composition obtained by heating a thermally-curable, aqueous binder composition that has been applied to fibers, such as a mat of non-woven fibers. In one aspect, the pH of the binder composition is greater than 7, or, illustratively, is in the range from about 7 to about 10. In one embodiment, the binder composition includes a polyacid component and a polyhydroxy component as described herein.

DETAILED DESCRIPTION

In an illustrative embodiment, a formaldehyde-free, thermally-curable, alkaline, aqueous binder composition is described. The binder composition includes a polyacid component having acid groups, or anhydride or salt derivatives thereof, and a polyhydroxy component having hydroxyl groups, where the pH of the binder composition is greater than 7, or, illustratively, is in the range from about 7 to about 10. The composition may be used as a binder for non-woven fibers, such as, for example, of fiberglass in the manufacture of insulation products. In one embodiment, it has been discovered that when a formaldehyde-free, alkaline, aqueous binder composition, including a polyacid component and a polyhydroxy component as described herein, is left for several days at room temperature or is heated for short periods of time in the absence of a catalyst capable of accelerating or increasing the rate of chemical reaction, a water-insoluble thermoset polyester resin is produced. Thus, a polyacid component has been found to be capable of reacting with a polyhydroxy component, under alkaline, aqueous conditions in the absence of a catalyst, to form a polyester resin.

In an illustrative embodiment, the formaldehyde-free, thermally-curable, alkaline, aqueous binder composition is substantially unreacted when it is applied to a substrate, such as a sample of non-woven fibers. Upon heating, the binder is dried and thermal curing is accomplished. It is to be understood that the drying and thermal curing may occur either sequentially, contemporaneously, or concurrently. As used herein, the term "thermally-curable" is intended to indicate that a structural or morphological change in the aqueous binder occurs upon heating that is sufficient to alter the properties of non-woven fibers to which an effective amount of binder has been applied; such changes include, but are not necessarily limited to, covalent reaction of components of the binder, improved adhesion of the binder components to the substrate, and hydrogen bonding of binder components.

The term "formaldehyde-free," as used herein, is meant to indicate that the aqueous binder composition is substantially free from formaldehyde, and does not liberate substantial formaldehyde as a result of drying and/or curing; typically, less than about 1 ppm formaldehyde, based on the weight of the composition, is present in a formaldehyde-free composition.

As used herein, the term "alkaline" is meant to indicate a solution pH that is greater than about 7, and is illustratively in the range from about 7 to about 10.

As used herein, the term "aqueous" includes water and mixtures composed substantially of water and other water-miscible solvents including, but not limited to, alcohols, ethers, amines, polar aprotic solvents, and the like.

As used herein, the terms "fiberglass," "non-woven fiber," and "glass fiber" are meant to indicate heat-resistant fibers suitable for withstanding elevated temperatures, such as mineral fibers, aramid fibers, ceramic fibers, metal fibers, carbon fibers, polyimide fibers, certain polyester fibers, rayon fibers, and glass fibers. Such fibers are substantially unaffected by exposure to temperatures above about 120° C.

In an illustrative embodiment, the formaldehyde-free, thermally-curable, alkaline, aqueous binder composition includes a polyacid component having acid groups, or anhydride or salt derivative thereof. In one aspect, the polyacid component is sufficiently nonvolatile to maximize its ability to remain available for reaction with the polyhydroxy component. The polyacid component may be substituted with other chemical functional groups. It is appreciated that other functional groups are selected to minimize their interference with the preparation or formation of the polyester resin. Illustratively, the polyacid component may be a dicarboxylic acid, such as, for example, maleic acid. Other suitable polyacid components are contemplated to include, but are not limited to, aconitic acid, adipic acid, azelaic acid, butane tetracarboxylic acid dihydride, butane tricarboxylic acid, chlorendic acid, citraconic acid, citric acid, dicyclopentadiene-maleic acid adducts, diethylenetriamine pentaacetic acid, adducts of dipentene and maleic acid, endomethylenehexachlorophthalic acid, ethylenediamine tetraacetic acid (EDTA), fully maleated rosin, maleated tall oil fatty acids, fumaric acid, glutaric acid, isophthalic acid, itaconic acid, maleated rosin-oxidize unsaturation with potassium eroxide to alcohol then carboxylic acid, malic acid, mesaconic acid, biphenol A or isphenol F reacted via the KOLBE-Schmidt reaction with carbon dioxide to introduce 3-4 carboxyl groups, oxalic acid, phthalic acid, polylactic acid, sebacic acid, succinic acid, tartaric acid, terephthalic acid, tetrabromophthalic acid, tetrachlorophthalic acid, tetrahydrophthalic acid, trimellitic acid, and trimesic acid, and anhydrides and salts thereof, and combinations thereof.

In an illustrative embodiment, the acid groups of the polyacid component of the formaldehyde-free, thermally-curable, alkaline, aqueous binder composition are neutralized with a base, and thereby converted to acid salt groups, prior to their reaction with the hydroxyl groups of the polyhydroxy component to form the polyester resin. It is understood that complete neutralization, i.e., about 100% calculated on an equivalents basis, may eliminate any need to titrate or partially neutralize acid groups in the polyacid component prior to polyester formation, but it is anticipated that less-than-complete neutralization would not inhibit formation of the polyester. "Base," as used herein, refers to a base which may be substantially volatile or non-volatile under conditions sufficient to promote formation of the polyester. Illustratively, the base may be a volatile base, such as, for example, aqueous ammonia; alternatively, the base may be a non-volatile base, such as, for example, sodium carbonate, and other non-volatile bases, such as sodium hydroxide, potassium hydroxide, and the like are contemplated. Neutralization may be carried out either before or after the polyacid component is mixed with the polyhydroxy component.

In an illustrative embodiment, the formaldehyde-free, thermally-curable, alkaline, aqueous binder composition also includes a polyhydroxy component having hydroxyl groups. In one aspect, the polyhydroxy component is sufficiently nonvolatile to maximize its ability to remain available for reaction with the polyacid component. The polyhydroxy component may be a polyvinyl alcohol, a partially hydrolyzed polyvinyl acetate, or mixtures thereof. Illustratively, when a partially hydrolyzed polyvinyl acetate serves as the polyhydroxy component, an 87-89% hydrolyzed polyvinyl acetate may be utilized, such as, for example, DuPont ELVANOL 51-05, which has a molecular weight of about 22,000-26,000 Da and a viscosity of 5.0-6.0 centipoises. Other partially hydrolyzed polyvinyl acetates contemplated to be useful include, but are not limited to, 87-89% hydrolyzed polyvinyl acetates differing in molecular weight and viscosity from ELVANOL 51-05, such as, for example, DuPont ELVANOL 51-04, ELVANOL 51-08, ELVANOL 50-14, ELVANOL 52-22, ELVANOL 50-26, and ELVANOL 50-42; and partially hydrolyzed polyvinyl acetates differing in molecular weight, viscosity, and degree of hydrolysis from ELVANOL 51-05, such as, for example, DuPont ELVANOL 51-03 (86-89% hydrolyzed), ELVANOL 70-14 (95.0-97.0% hydrolyzed), ELVANOL 70-27 (95.5-96.5% hydrolyzed), ELVANOL 60-30 (90-93% hydrolyzed), ELVANOL 70-03 (98.0-98.8% hydrolyzed), ELVANOL 70-04 (98.0-98.8% hydrolyzed), ELVANOL 70-06 (98.5-99.2% hydrolyzed), ELVANOL 90-50 (99.0-99.8% hydrolyzed), ELVANOL 70-20 (98.5-99.2% hydrolyzed), ELVANOL 70-30 (98.5-99.2% hydrolyzed), ELVANOL 71-30 (99.0-99.8% hydrolyzed), ELVANOL 70-62 (98.4-99.8% hydrolyzed), ELVANOL 70-63 (98.5-99.2% hydrolyzed), and ELVANOL 70-75 (98.5-99.2% hydrolyzed).

In an illustrative embodiment, the formaldehyde-free, thermally-curable, alkaline, aqueous binder composition may also include a catalyst capable of increasing the rate of polyester formation during curing of the binder compositions described herein. Illustratively, the catalyst may be an ammonium salt, such as, for example, ammonium para-toluene sulfonate or ammonium naphthalene disulfonate. Other suitable catalysts are contemplated to include, but are not limited to, ammonium sulfate, ammonium chloride, sulfuric acid, lactic acid, lead acetate, sodium acetate, calcium acetate, zinc acetate, organotin compounds, titanium esters, antimony trioxide, germanium salts, sodium hypophosphite, sodium phosphite, methane sulfonic acid and para-toluene sulfonic acid, and mixtures thereof. Although additional catalysts may be contemplated, it is to be understood that the binder compositions described herein neither require nor are limited to any particular catalyst composition or amount thereof and the addition of such compounds is optional.

In an illustrative embodiment, the formaldehyde-free, thermally-curable, alkaline, aqueous binder composition may also include a silicon-containing coupling agent (e.g., organo-silicon oil). Silicon-containing coupling agents have been marketed by the Dow-Corning Corporation, Petrarch Systems, and by the General Electric Company. Their formulation and manufacture are well known such that detailed description thereof need not be provided. Illustratively, the silicon-containing coupling agent may be compounds such as silylethers and alkylsilyl ethers. In one aspect, the silicon-containing compound is an amino-substituted silane, such as, for example, gamma-aminopropyltriethoxy silane (Dow SILQUEST A-1101). When employed in an illustrative embodiment, silicon-containing coupling agents typically are present in the binder composition in an amount within the range of about 0.1 to about 2.0 percent by weight based upon the binder solids. It is to be understood that the binder compositions described herein neither require nor are limited to any particular silicon-containing compound or amount thereof and the addition of such compounds is optional.

In an illustrative embodiment, the formaldehyde-free, thermally-curable, alkaline, aqueous binder composition may be prepared by admixing a 10-50 weight percent aqueous solution of a polyacid component, already neutralized or neutralized in the presence of the polyhydroxy component, a 10-30 weight percent aqueous solution of a polyhydroxy component, and, if desired, an aqueous solution of a catalyst capable of increasing the rate of polyester formation during curing, and also, if desired, a silicon-containing coupling agent. By varying the polyacid component, the polyhydroxy component, and optional catalyst and silicon-containing coupling agent compositions, the initial concentrations thereof, and the mixing ratio of solutions, a wide range of binder solution compositions can be prepared, wherein the pH of the binder composition is alkaline, and illustratively in the range from about 7 to about 10. Thus, while avoiding acidic binder compositions, which tend to cause corrosion problems in manufacturing equipment, the health-related and compliance-related benefits provided by a formaldehyde-free composition are maintained. Further, the alkaline, formaldehyde-free binder compositions described herein provide advantages of permitting the use of existing manufacturing equipment in fiberglass manufacturing plants and eliminating the need to retrofit such plants with stainless steel equipment.

The following examples illustrate embodiments of the invention in further detail. These examples are provided for illustrative purposes only and should not be construed as limiting the invention or the inventive concept to any particular physical configuration. For example, although the ratio of the number of molar equivalents of acid groups, or anhydride or salt derivatives thereof, in the polyacid component to the number of molar equivalents of hydroxyl groups in the polyhydroxy component is in the range of from about 0.6:1 to about 1.2:1, it is to be understood that, in variation of the embodiments described herein, these ratios may be altered without affecting the nature of the invention described.

Example 1

ELVANOL 51-05 was prepared as a 14.5% solution in water (17.25 g of ELVANOL 51-05 per 119 g of solution).

Example 2

To 205 g of water being stirred at room temperature were added successively 118.5 g of a 14.5% solution of ELVANOL 51-05 (17.2 g) and 76 g of a 30% solution of maleic acid (22.8 g) to produce approximately 400 g of clear, colorless solution. To 50 g of ELVANOL 51-05/maleic acid solution were added 20.3 g of an 18% solution of sodium carbonate (3.65 g). The resulting mixture was stirred at room temperature to produce approximately 70.3 g of hazy solution. This solution exhibited a pH of 8, and consisted of approximately 24.8% ELVANOL 51-05, 32.9% maleic acid, and 42.2% sodium carbonate (as a relative percentage of total dissolved solids), and contained about 12% dissolved solids (as a percentage of total weight of solution).

Example 3

To 50 g of ELVANOL 51-05/maleic acid solution, prepared as described in Example 2, were added 0.3 g of an 18% solution of sodium carbonate (0.05 g). The resulting mixture was stirred at room temperature to produce approximately 50.3 g of solution. This solution consisted of approximately 42.6% ELVANOL 51-05, 56.4% maleic acid, and 1.0% sodium carbonate (as a relative percentage of total dissolved solids), and contained about 10% dissolved solids (as a percentage of total weight of solution).

Example 4

To 50 g of ELVANOL 51-05/maleic acid solution, prepared as described in Example 2, were added 6 g of a 19% solution of ammonia. The resulting mixture was stirred at room temperature to produce approximately 56 g of solution. This solution exhibited a pH of 9.5, and consisted of approximately 43.0% ELVANOL 51-05 and 57.0% maleic acid (as a relative percentage of total dissolved solids), and contained about 9% dissolved solids (as a percentage of total weight of solution).

Example 5

To 127 g of water being stirred at room temperature were added successively 80 g of a 14.5% solution of ELVANOL 51-05 (11.6 g) and 73 g of a 27% solution of ammonium maleate (equivalent to 15.3 g of maleic acid solids) to produce approximately 280 g of clear, colorless solution. This solution exhibited a pH of 7.94 (after 9 days), and consisted of approximately 43% ELVANOL 51-05 and 57% maleic acid (as a relative percentage of total dissolved solids), and contained about 10% dissolved solids (as a percentage of total weight of solution). Upon standing for eleven days at room temperature, a tough, insoluble film was observed on the bottom of the reaction flask.

Example 6

To 50 g of ELVANOL 51-05/ammonium maleate solution, prepared as described in Example 5, were added 20 g of a 15% solution of ammonium para-toluene sulfonate (3 g). The resulting mixture was stirred for approximately 5 minutes at room temperature to produce approximately 70 g of clear, colorless solution. This solution exhibited a pH of 8.28, and consisted of approximately 26.5% ELVANOL 51-05, 35.0% maleic acid, and 38.5% ammonium para-toluene sulfonate (as a relative percentage of total dissolved solids), and contained about 11% dissolved solids (as a percentage of total weight of solution).

Example 7

To 50 g of ELVANOL 51-05/ammonium maleate solution, prepared as described in Example 5, were added 3.3 g of a 15% solution of ammonium para-toluene sulfonate (0.5 g). The resulting mixture was stirred for approximately 9 minutes at room temperature to produce approximately 53.3 g of clear, colorless solution. This solution exhibited a pH of 8.17, and consisted of approximately 39.1% ELVANOL 51-05, 51.5% maleic acid, and 9.4% ammonium para-toluene sulfonate (as a relative percentage of total dissolved solids), and contained about 10% dissolved solids (as a percentage of total weight of solution).

Example 8

To 148 g of water being stirred at room temperature were added successively 303 g of a 14.5% solution of ELVANOL 51-05 (43.9 g), 147 g of a 27% solution of ammonium maleate (equivalent to 30.9 g of maleic acid solids), 67 g of a 15% solution of ammonium para-toluene sulfonate (10.0 g), and 2.0 g of SILQUEST A-1101 silane to produce approximately 667 g of solution. This solution exhibited a pH of 8.61, and consisted of approximately 50.6% ELVANOL 51-05, 35.6% maleic acid, 11.5% ammonium para-toluene sulfonate, and 2.3% SILQUEST A-1101 silane (as a relative percentage of total dissolved solids), and contained about 13% dissolved solids (as a percentage of total weight of solution).

Example 9

To 162 g of water being stirred at room temperature were added successively 276 g of a 14.5% solution of ELVANOL 51-05 (40.0 g), 160 g of a 27% solution of ammonium maleate (equivalent to 33.6 g of maleic acid solids), 67 g of a 15% solution of ammonium para-toluene sulfonate (10.0 g), and 2.0 g of SILQUEST A-1101 silane to produce approximately 667 g of solution. This solution exhibited a pH of 8.60, and consisted of approximately 46.7% ELVANOL 51-05, 39.3% maleic acid, 11.7% ammonium para-toluene sulfonate, and 2.3% SILQUEST A-1101 silane (as a relative percentage of total dissolved solids), and contained about 13% dissolved solids (as a percentage of total weight of solution).

Example 10

To 54 g of water being stirred at room temperature were added successively 72 g of a 14.5% solution of ELVANOL 51-05 (10.4 g), 53 g of a 27% solution of ammonium maleate (equivalent to 11.1 g of maleic acid solids), 20 g of a 15% solution of ammonium para-toluene sulfonate (3 g), and 0.6 g of SILQUEST A-1101 silane to produce approximately 200 g of solution. This solution exhibited a pH of 8.58, and consisted of approximately 41.4% ELVANOL 51-05, 44.2% maleic acid, 11.9% ammonium para-toluene sulfonate, and 2.4% SILQUEST A-1101 silane (as a relative percentage of total dissolved solids), and contained about 12% dissolved solids (as a percentage of total weight of solution).

Example 11

To 58 g of water being stirred at room temperature were added successively 64 g of a 14.5% solution of ELVANOL 51-05 (9.3 g), 57 g of a 27% solution of ammonium maleate (equivalent to 12.0 g of maleic acid solids), 20 g of a 15% solution of ammonium para-toluene sulfonate (3 g), and 0.6 g of SILQUEST A-1101 silane to produce approximately 200 g of solution. This solution exhibited a pH of 8.59, and consisted of approximately 37.3% ELVANOL 51-05, 48.2% maleic acid, 12.0% ammonium para-toluene sulfonate, and 2.4% SILQUEST A-1101 silane (as a relative percentage of total dissolved solids), and contained about 12% dissolved solids (as a percentage of total weight of solution).

Example 12

To 126 g of water being stirred at room temperature were added successively 80 g of a 14.5% solution of ELVANOL 51-05 (11.6 g), 20 g of a 15% solution of ammonium para-toluene sulfonate (3 g), 73 g of a 27% solution of ammonium maleate (equivalent to 15.3 g of maleic acid solids), and 0.65 g of SILQUEST A-1101 silane to produce approximately 300 g of clear, colorless solution. This solution exhibited a pH of 8.15 (at +17 hours), and consisted of approximately 38.0% ELVANOL 51-05, 50.1% maleic acid, 9.8% ammonium para-toluene sulfonate, and 2.1% SILQUEST A-1101 silane (as a relative percentage of total dissolved solids), and contained about 10% dissolved solids (as a percentage of total weight of solution).

Example 13

To 126 g of water being stirred at room temperature were added successively 80 g of a 14.5% solution of ELVANOL 51-05 (11.6 g), 73 g of a 27% solution of ammonium maleate (equivalent to 15.3 g of maleic acid solids), 120 g of a 15% solution of ammonium para-toluene sulfonate (18 g), and 0.63 g of SILQUEST A-1101 silane to produce approximately 400 g of clear, colorless solution. This solution exhibited a pH of 7.91 (at +17 hours), and consisted of approximately 25.5% ELVANOL 51-05, 33.6% maleic acid, 39.5% ammonium para-toluene sulfonate, and 1.4% SILQUEST A-1101 silane (as a relative percentage of total dissolved solids), and contained about 11% dissolved solids (as a percentage of total weight of solution).

Example 14

To 126 g of water being stirred at room temperature were added successively 80 g of a 14.5% solution of ELVANOL 51-05 (11.6 g), 73 g of a 27% solution of ammonium maleate (equivalent to 15.3 g of maleic acid solids), 10 g of a 30% solution of ammonium naphthalene disulfonate (3 g), and 0.6 g of SILQUEST A-1101 silane to produce approximately 290 g of clear, colorless solution. This solution exhibited a pH of 7.89 (at +17 hours), and consisted of approximately 38.0% ELVANOL 51-05, 50.2% maleic acid, 9.8% ammonium naphthalene disulfonate, and 2.0% SILQUEST A-1101 silane (as a relative percentage of total dissolved solids), and contained about 10% dissolved solids (as a percentage of total weight of solution).

Example 15

To 81 g of a 51% solution of T 2894 phenol-formaldehyde resin (41.3 g) were added 35 g of a 40% solution of urea (14 g). The resulting solution was stirred at room temperature and then were added successively 251 g of water, 7.9 g of a 19% solution of ammonia, 23.3 g of a 15% solution of ammonium para-toluene sulfonate (3.5 g), and 1.05 g of SILQUEST A-1101 silane to produce approximately 400 g of clear, colorless solution. This solution exhibited a pH of 8.14, and consisted of approximately 69.0% T 2894 phenol-formaldehyde resin, 23.4% urea, 5.8% ammonium para-toluene sulfonate, and 1.8% SILQUEST A-1101 silane (as a relative percentage of total dissolved solids), and contained about 15% dissolved solids (as a percentage of total weight of solution).

Example 16

To 112.98 g of a 25.3% solution of Rohm-Haas T SET #1 (28.6 g) were added 77.58 g of water to produce approximately 190.56 g of clear, colorless solution. This solution, consisting of 100% T SET #1 (as a relative percentage of total dissolved solids), exhibited a pH of 4.08 and contained about 15% dissolved solids (as a percentage of total weight of solution).

Example 17

To 99.75 g of Rohm-Haas T SET #1 solution, prepared as described in Example 16, were added 0.23 g of SILQUEST A-1101 silane to produce approximately 100 g of clear, colorless solution. This solution exhibited a pH of 4.06, and consisted of approximately 98.5% T SET #1 and 1.5% SILQUEST A-1101 silane (as a relative percentage of total dissolved solids), and contained about 15% dissolved solids (as a percentage of total weight of solution).

Example 18

General Procedure for Preparation of Cured Binder Samples

In order to evaluate aqueous binder compositions under thermal curing conditions, 1-g samples of each binder composition were placed onto one or more individual aluminum plates. Each binder composition was then subjected to one or more of the following bake-out/cure conditions in pre-heated ovens in order to produce the corresponding cured binder sample: 0.5 hour at 300° F. and 0.5 hour at 350° F.

Example 19

Testing/Evaluation of Cured Binder Samples

Dry flexibility, dry strength, and wet strength were determined for cured binder samples on a scale ranging from 0, corresponding to none, to 10, corresponding to excellent, as follows: Dry flexibility was determined as the extent to which a binder sample, generally present as a film adhering to the aluminum plate, resisted breaking upon flexing the plate metal. Dry strength was determined as the extent to which a binder sample remained intact and resisted breakage following removal from a pre-heated oven. Wet strength was determined as the extent to which a binder sample appeared to have cured, as indicated by its tendency either to adhere to the surface of the aluminum plate as an intact, solid mass or, if not adherent, to remain intact and resist breakage, following addition of 10 mL of water and subsequent standing overnight at room temperature. Complete dissolution of a binder sample in 10 mL of water corresponded to a wet strength value of 0. The appearance of cured binder samples was also determined. Results are presented in Table 1.

TABLE 1

Testing Results from Cured Binder Samples

| Example No. (composition as % solids) | Cure Temp | Dry Flexibility | Dry Strength | Wet Strength | COOH/OH Ratio | Appearance |
|---|---|---|---|---|---|---|
| 1 PVA (100%) | 300° F. | — | — | 0 | — | Film |
| 2 PVA/MA/SC (24.8%:32.9%:42.2%) | 300° F. | — | — | 0 | 1.25 | Opaque |
| 3 PVA/MA/SC (42.6%:56.4%:1.0%) | 300° F. | — | — | 5 | 1.25 | Transparent |
| 4 PVA/MA—$NH_3$ (43%:57%) | 300° F. | — | — | 3 | 1.25 | Opaque |
| 5 PVA/AM (43%:57%) | 300° F. | — | — | 0 | 1.25 | Off-white |
|  | 350° F. | — | — | 5 |  | Orange-yellow |
| 6 PVA/AM/ATS (26.5%:35.0%:38.5%) | 350° F. | — | 10 | 5 | 1.24 | Dirty-orange |
| 7 PVA/AM/ATS (39.1%:51.5%:9.4%) | 350° F. | — | 10 | 5 | 1.24 | Yellow-orange |
| 8 PVA/AM/ATS/SILQUEST (50.6%:35.6%:11.5%:2.3%) | 300° F. | 10 | — | 0 |  | Colorless |
|  | 350° F. | 0 | — | 8 | 0.66 | Orange-brown |
| 9 PVA/AM/ATS/SILQUEST (46.7%:39.3%:11.7%:2.3%) | 300° F. | 10 | — | 5 |  | Colorless |
|  | 350° F. | 0 | — | 8 | 0.79 | Light orange |
| 10 PVA/AM/ATS/SILQUEST (41.4%:44.2%:11.9%:2.4%) | 300° F. | 10 | — | 6 |  | Light tan |
|  | 350° F. | 10 | — | 9 | 1.00 | — |
| 11 PVA/AM/ATS/SILQUEST (37.3%:48.2%:12.0%:2.4%) | 300° F. | "tacky" | — | 1 |  | Colorless |
|  | 350° F. | — | — | 9 | 1.22 | Light orange |
| 12 PVA/AM/ATS/SILQUEST (38.0%:50.1%:9.8%:2.1%) | 300° F. | 10 | 10 | 2 |  | Off-white |
|  | 350° F. | 10 | 10 | 8 | 1.24 | Orange-brown |
| 13 PVA/AM/ATS/SILQUEST (25.5%:33.6%:39.5%:1.4%) | 300° F. | 10 | 10 | 2 |  | Off-white |
|  | 350° F. | 0 | 10 | 5 | 1.24 | Brown-orange |
| 14 PVA/AM/AND/SILQUEST (38.0%:50.2%:9.8%:2.0%) | 300° F. | 10 | 10 | 0 |  | White |
|  | 350° F. | 10 | 10 | 4 | 1.24 | Light brown |
| 15 PF/U/ATS/SILQUEST (69.0%:23.4%:5.8%:1.8%) | 300° F. | 0 | 10 | 10 |  | Yellow |
|  | 350° F. | 0 | 10 | 10 | — | Dull yellow |
| 16 T SET #1 (100%) | 300° F. | 10 | 10 | 8 |  | Colorless |
|  | 350° F. | 0 | 10 | 8 | — | Colorless |
| 17 T SET #1-SILQUEST (98.5%:1.5%) | 300° F. | 10 | 10 | 8 |  | Colorless |
|  | 350° F. | 0 | 10 | 8 | — | — |

PVA = ELVANOL 51-05 (87-89% hydrolyzed polyvinyl acetate)
ATS = Ammonium para-toluene sulfonate
SC = Sodium Carbonate
SILQUEST = Gamma-aminopropyltriethoxy (A-1101) silane
AND = Ammonium naphthalene disulfonate
U = Urea
MA = Maleic acid
AS = Ammonium sulfate
$NH_3$ = Aqueous ammonia
AM = Ammonium maleate
PF = Phenol formaldehyde resin
T-Set #1 = Rohm-Haas formaldehyde-free binder While certain embodiments of the present invention have been described and/or exemplified above, it is contemplated that considerable variation and modification thereof are possible. Accordingly, the present invention is not limited to the particular embodiments described and/or exemplified herein.

The invention claimed is:

1. A formaldehyde free binder composition, comprising:
a reaction product of a polycarboxylic acid component with a polymeric polyhydroxyl component, wherein
   i) the polycarboxylic acid component and polyhydroxyl component have an alkaline pH,
   ii) the ratio of the number of molar equivalents of acid groups of the polycarboxylic acid to the number of molar equivalents of hydroxyl groups of the polymeric polyhydroxyl component is in the range from about 0.6:1 to about 1.2:1,
   iii) the polycarboxylic acid component is selected from a dicarboxylic acid, tricarboxylic acid, tetra carboxylic acid, or penta carboxylic acid, and salts and anhydride derivatives thereof, and combinations thereof, and
   iv) the reaction product consists of a maximum of 5 ester linkages between a given molecule of the polycarboxylic acid component and one or more molecule of the polymeric polyhydroxyl components.

2. The binder composition of claim 1, wherein the binder composition has a pH in the range from about 7 to about 10.

3. The binder composition of claim 1, wherein the binder composition is an aqueous binder composition resulting from admixing a solution containing 10-50 weight percent of the polycarboxylic component and a second solution containing 10-30 weight percent of the polymeric polyhydroxyl component.

4. The binder composition of claim 3, wherein the aqueous binder composition contains less than about 15% dissolved solids.

5. An insulation product, comprising:
glass fibers in contact with an alkaline formaldehyde-free binder composition, wherein:
   (i) the binder composition includes a reaction product of a polycarboxylic acid component with a polymeric polyhydroxyl component,
   (ii) the polymeric polyhydroxy component includes a partially hydrolyzed polyvinyl acetate,
   (iii) the polycarboxylic acid component is selected from a dicarboxylic acid, tricarboxylic acid, tetra carboxylic acid, or penta carboxylic acid, and salts and anhydride derivatives thereof, and combinations thereof, and
   (iv) the reaction product consists of a maximum of 5 ester linkages between a given molecule of the polycarboxylic acid component and one or more molecule of the polymeric polyhydroxyl components.

6. The insulation product of claim 5, wherein the polymeric polyhydroxy component includes an 87% to 89% hydrolyzed polyvinyl acetate.

7. The insulation product of claim 5, wherein the binder composition has a pH from about 7 to about 10.

8. The insulation product of claim 5, wherein the ratio of the number of molar equivalents of acid groups of the polycarboxylic acid component to the number of molar equivalents of hydroxyl groups of the polymeric polyhydroxyl component is in the range from about 0.6:1 to about 1.2:1.

9. An insulation product comprising:
glass fibers in contact with a formaldehyde-free binder composition wherein the binder composition includes an ester-linked reaction product of a dicarboxylic acid, tricarboxylic acid, tetra carboxylic acid, or penta carboxylic acid, or salts or anhydride derivatives thereof, or combinations thereof with a polymeric polyhydroxyl component characterized by the dicarboxylic acid or salts or anhydride derivatives thereof forming a maximum of two ester bonds with the polymeric polyhydroxyl component, the tricarboxylic acid or salts or anhydride derivatives thereof forming a maximum of three ester bonds with the polymeric polyhydroxyl component, the tetra carboxylic acid or salts or anhydride derivatives thereof forming a maximum of four ester bonds with the polymeric polyhydroxyl component, the penta carboxylic acid forming or salts or anhydride derivatives thereof a maximum of five ester bonds with the polymeric polyhydroxyl component and the binder composition has a pH of about 7 to about 10.

10. A method of making a formaldehyde-free insulation product comprising;
disposing an aqueous solution that includes a substantially unreacted dicarboxylic acid, tricarboxylic acid, tetra carboxylic acid, or penta carboxylic acid, or salts or anhydride derivatives thereof, or combinations thereof and a polymeric polyhydroxyl component onto glass fibers and curing the glass fiber aqueous solution composition to produce a formaldehyde-free water insoluble thermoset polyester resin disposed on the glass fibers.

11. The method of claim 10, wherein the polymeric polyhydroxyl component includes a partially hydrolyzed polyvinyl acetate.

12. The method of claim 11 wherein the partially hydrolyzed polyvinyl acetate is 87% to 89% hydrolyzed.

13. A composition comprising a polyester binder disposed on a collection of fibers, the polyester binder being a reaction product of:
   (i) dehydrating an alkaline solution consisting of a hydrolyzed polyvinyl acetate component, a polycarboxylic acid component and a silicon-containing compound and
   (ii) curing in contact with the collection of fibers.

14. The composition of claim 13, wherein the reaction product comprises ester linkages between the polycarboxylic acid and the hydrolyzed polyvinyl acetate.

15. The composition of claim 13, wherein the polycarboxylic acid is selected from the group consisting of aconitic acid, adipic acid, azelaic acid, butane tetracarboxylic acid dihydride, butane tricarboxylic acid, chlorendic acid, citraconic acid, citric acid, dicyclopentadiene-maleic acid adducts, diethylenetriamine pentaacetic acid, adducts of dipentene and maleic acid, endomethylenehexachlorophthalic acid, ethylenediamine tetraacetic acid (EDTA), fully maleated rosin, maleated tall oil fatty acids, fumaric acid, glutaric acid, isophthalic acid, itaconic acid, maleated rosin-oxidize unsaturation with potassium peroxide to alcohol then carboxylic acid, malic acid, mesaconic acid, biphenol A or bisphenol F reacted via the KOLBE-Schmidt reaction with carbon dioxide to introduce 3-4 carboxyl groups, oxalic acid, phthalic acid, polylactic acid, sebacic acid, succinic acid, tartaric acid, terephthalic acid, tetrabromophthalic acid, tetrachlorophthalic acid, tetrahydrophthalic acid, trimellitic acid, and trimesic acid, and anhydrides and salts thereof, and combinations thereof.

* * * * *